United States Patent [19]

Dittmar et al.

[11] Patent Number: 5,781,699
[45] Date of Patent: Jul. 14, 1998

[54] METHOD FOR OPTIMIZATION OF CHANNEL PARAMETERS IN A DATA STORAGE DEVICE

[75] Inventors: Mark Dittmar, Westminster; James Alexander, Boulder, both of Colo.

[73] Assignee: Maxtor Corporation, Longmont, Colo.

[21] Appl. No.: 731,827

[22] Filed: Oct. 21, 1996

[51] Int. Cl.⁶ ........................................................ G06F 15/18
[52] U.S. Cl. ................................................ 395/13; 395/902
[58] Field of Search ................................ 395/10–13, 902; 364/496

[56] References Cited

U.S. PATENT DOCUMENTS 5,400,436  3/1995  Nara et al. ................................ 395/13
5,428,709  6/1995  Banzhaf ..................................... 395/13
5,434,796  7/1995  Weininger ................................ 364/496

*Primary Examiner*—Tariq R. Hafiz
*Attorney, Agent, or Firm*—Sheridan Ross P.C.

[57] ABSTRACT

A method is disclosed for tuning parameter values in a recording channel of a data storage device. The parameter values are tuned using a genetic process based on the principles of simulated evolution. An initial population of individuals is generated wherein each individual includes a value for each of a plurality of channel parameters. Fitness values are then calculated for each of the individuals. Individuals are then chosen for mating from the initial population based on the calculated fitness values. The chosen individuals are manipulated using genetic operators to produce a new population of parameter strings. Fitness values are then calculated for the new population and the cycle is repeated. The process is continued until a desired fitness is achieved or a predetermined number of generations have been produced. After the process has ended, an individual is chosen based on fitness values and the channel parameters of the data storage system are set accordingly.

32 Claims, 12 Drawing Sheets

| A1 | 0 | 0 | 1 | 0 | 0 | 1 | 1 | 1 | 0 | 1 |
|---|---|---|---|---|---|---|---|---|---|---|
| B1 | 0 | 1 | 0 | 0 | 1 | 0 | 0 | 1 | 1 | 0 |
| bit position | 1 | 2 | 3 | 4 | 5 | 6 | 7 | 8 | 9 | 10 |

CROSSOVER ⇑

| A2 | 0 | 1 | 0 | 0 | 0 | 1 | 1 | 1 | 0 | 1 |
|---|---|---|---|---|---|---|---|---|---|---|
| B2 | 0 | 0 | 1 | 0 | 1 | 0 | 0 | 1 | 1 | 0 |
| bit position | 1 | 2 | 3 | 4 | 5 | 6 | 7 | 8 | 9 | 10 |

FIG. 5

A1  0  0  1  0  →0  1  0  1  1  1  0  1  MUTATION ⇒  A2  0  0  1  →1  0  1  1  1  0  1

FIG. 6

METHOD FOR OPTIMIZATION OF CHANNEL PARAMETERS IN A DATA STORAGE DEVICE

FIELD OF THE INVENTION

The present invention relates in general to data storage systems and, more particularly, to the optimization of system parameters in a data storage system.

BACKGROUND OF THE INVENTION

Mass data storage systems, such as disk drives and optical drives, are generally used in computer systems to store large amounts of information for potential use by a host computer. This information may include, for example, program files and/or data files. When the host computer wishes to retrieve information from the storage system, such as when a user wishes to run a certain program, the host causes the information to be transferred from the storage system to the host's random access memory (RAM). Once transferred, the information may be used by the host in the appropriate manner. Some mass storage systems also allow the host to write information to the storage system.

To perform their designed function, data storage systems must include a storage medium capable of holding stored information in a readable form. For example, magnetic disk drives generally store information on disks having at least one surface coated with a magnetic material. Information is usually stored on the storage medium in a form that is unrecognizable by the host computer and that is a function of the particular medium being used. Therefore, after the information is read from the medium using a transducer, the information must be converted to a form that can be used by the host computer before it is transferred to the host's RAM.

To perform the information conversion function, data storage systems generally include a recording channel between the storage medium and the host computer. The recording channel receives the signal read from the storage medium and converts the signal to a form that is recognizable by the host computer. In storage systems that allow the host to transfer information to the storage medium, the recording channel may also be operative for converting information from the host computer into a form that can be stored on the associated storage medium.

A recording channel may be required to perform any number of different functions. The functions that a particular recording channel is required to perform are generally dependent on the type of storage medium being used and the manner in which information is stored on the medium. For example, magnetic disk drive systems generally store information in the form of magnetic polarity transitions, i.e., the surface of the disk includes a series of polarity reversals from a north-south orientation to a south-north orientation, and vice versa, that can be detected by a transducer. The channel, therefore, must be able to detect the polarity transitions in the signal read by the transducer. In addition, the channel should be capable of recovering timing information from the read signal to be used in clocking the resulting data signal. Further, the channel must be capable of removing any encoding from the signal after the transitions have been detected and timing has been restored.

Recording channels generally include a plurality of adjustable parameters that effect the overall operation of the data storage system. In this regard, the performance of the storage system depends on the determination of optimal values for the various channel parameters. Therefore, it is important that a method be provided for tuning the channel parameter values in a data storage system to achieve an acceptable performance from the system.

In the past, recording channels were generally tuned using a brute force method. That is, an array of channel parameter settings were applied to the channel one at a time, often manually, and the resulting system performance was measured. When a set of channel parameters was found that resulted in acceptable system performance, these values were stored for later use by the channel. Because the brute force method tests all or most of the possible combinations of parameter values, it is extremely slow and significantly increases the total manufacturing time for a data storage device. Increased manufacturing time creates higher costs which results in reduced profits and/or increased prices to customers.

Therefore, a need exists for a method and apparatus for rapidly and accurately tuning parameter values in the recording channel of a data storage system.

SUMMARY OF THE INVENTION

The present invention provides a method and apparatus for rapidly tuning channel parameter values in a data storage system. The invention makes use of a genetic process for adaptively tuning the parameter values based on simulated evolution. The invention requires no complex math calculations and is simple enough to be resident on the drive itself. The invention may be used in conjunction with virtually any type of recording channel and is particularly apt for use in complex channels, such as those including partial response maximum likelihood (PRML) or decision feedback circuitry.

In one aspect of the present invention, a data storage device is provided. The data storage device includes: (a) a storage medium; (b) a channel for use in transferring data between said storage medium and an exterior environment, said channel having a plurality of adjustable parameters; (c) means for use in tuning said adjustable parameters of said channel, said means for use in tuning comprising: (i) means for determining a first set of channel parameter values; (ii) means for applying said first set of channel parameter values to said channel; (iii) means for calculating a fitness value for said first set of channel parameter values based on the performance of said data storage device using said first set of channel parameter values, said fitness value being indicative of the desirability of said first set of channel parameter values; and (iv) means for determining a second set of channel parameter values based on said fitness value.

In a preferred embodiment, the means for tuning tunes the adjustable parameters using a genetic process. The channel can include, for example, a PRML channel, a peak detection channel, or a decision feedback channel. The means for determining a first set of channel parameter values can determine the values, for example, randomly or based on parameter value ranges that are likely to produce better fitness values. The fitness value is a measure of the performance of the data storage device when a particular set of channel parameter values are being applied to the channel. In this regard, the fitness value can be based upon any aspect of data storage device performance that is capable of being measured. For example, the fitness value can be calculated based on the bit error rate produced by the data storage system while writing and subsequently reading data.

The first and second set of channel parameter values can each include a plurality of parameter value strings that each have a value for each of a plurality of parameters. The second set of channel parameter values is determined by selecting parameter value strings from the first set of channel parameter values based on corresponding fitness values. The selected parameter value strings are then altered using, for example, genetic operations, such as crossover and mutation to obtain the second set of channel parameter strings. The process may then be repeated until a desired fitness value is achieved.

In another aspect of the present invention, a method for tuning a channel in a data storage device is provided. The method comprises the steps of: (a) providing a channel having a plurality of adjustable parameters; (b) determining a first set of channel parameter values; (c) applying said first set of channel parameter values to said channel; (d) calculating at least one fitness value for said first set of channel parameter values based on the performance of said data storage device using said first set of channel parameter values, said fitness value being indicative of the desirability of said first set of channel parameter values; and (e) determining a second set of channel parameter values based on said fitness value.

In one embodiment, the steps of applying, calculating, and determining are repeated for a plurality of successive channel parameter value sets. As described above, the parameter value sets can each include a plurality of parameter value strings that each have a value for each of a plurality of parameters. In addition, default values can be used to determine the first set of channel parameter values. The default values used to determine the channel parameter values can be periodically updated based on information relating channel parameter values determined for other data storage devices.

In another aspect of the present invention, a method for tuning a channel in a data storage device is provided. The method comprises the steps of: providing a plurality of parameter value strings, each parameter value string including a value for each of a plurality of predetermined channel parameters; first determining fitness values for parameter value strings in said plurality; genetically altering selected parameter value strings in said plurality of parameter value strings to create a modified plurality of parameter value strings; second determining fitness values for parameter value strings in said modified plurality; and choosing a parameter value string that produces a best fitness value.

During a tuning procedure, the steps of genetically altering and second determining can be repeated until a predetermined criterion, such as the achievement of a minimum fitness value, has been satisfied. The step of providing a plurality of parameter value strings can provide the strings in a random fashion or based on parameter value ranges that are likely to produce better fitness values. The step of genetically altering can include selecting parameter value strings from the plurality of parameter value strings based on fitness values. The step of genetically altering can also include performing genetic operations, such as crossover and mutation. The method can also include the step of storing selected fitness values determined in the determining steps in a memory along with corresponding parameter value strings. The memory can then be accessed to choose the parameter value string having the best fitness value.

BRIEF DESCRIPTION OF THE DRAWINGS

FIG. 5 is a diagram illustrating a crossover operation that is performed in accordance with one embodiment of the present invention;

FIG. 6 is a diagram illustrating a mutation operation that is performed in accordance with one embodiment of the present invention;

DETAILED DESCRIPTION

The present invention relates to a method and apparatus for rapidly tuning channel parameter values for a recording channel in a data storage system. The invention makes use of a genetic process for adaptively tuning the parameter values based on simulated evolution. The invention may be used in any type of recording channel, regardless of the detection methods used by the channel. For example, the invention may be used in a peak detection channel; a PRML channel, such as a PR4, EPR4, $E^2PR4$, or $E^3PR4$ channel; a decision feedback equalizer (DFE) channel; a fixed delay tree search (FDTS) channel; or any other type of channel that may be used in a data storage system. In addition, the invention may be used to tune parameters in a data storage system other than channel parameters, such as cylinder head skews, average seek time, and write caching. The invention is capable of significantly decreasing the time required for tuning a recording channel as compared to prior (i.e., manual and variations of brute force) tuning methods.

Figure 1:
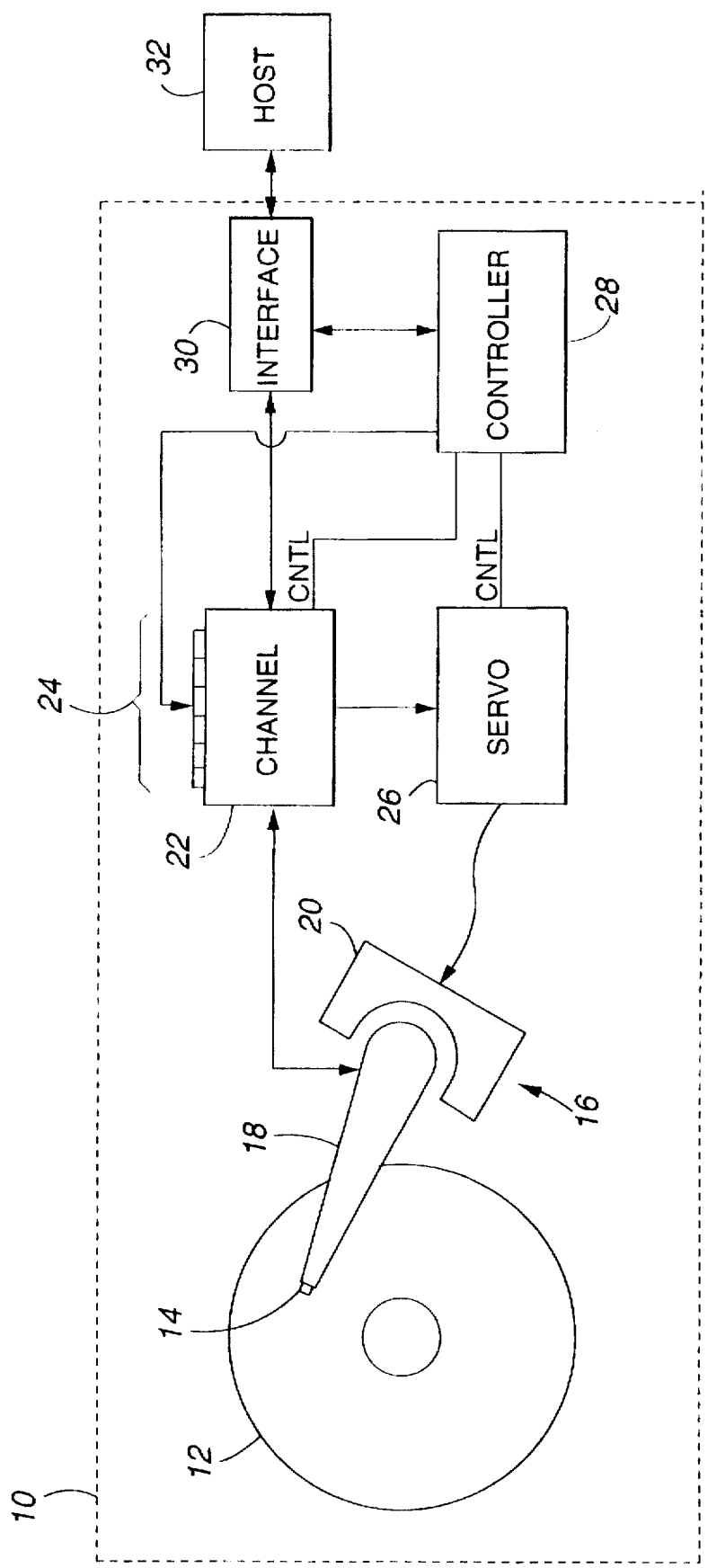
FIG. 1 is a block diagram illustrating a data storage system having a channel that can be tuned using the techniques of the present invention.

FIG. 1 is a simplified block diagram of a disk drive system 10 that may utilize features of the present invention. The disk drive system 10 includes a disk 12, a transducer 14, an actuator assembly 16 that includes an actuator arm 18 and a voice coil motor (VCM) 20, a recording channel 22 having a plurality of parameter value inputs 24, a servo control unit 26, a controller unit 28, and an interface unit 30 for providing an interface between the system 10 and an external host computer 32. During operation of the disk drive 10, the disk 12 rotates about an axis at a constant angular velocity. Data is stored on the surface of the disk 12 in substantially concentric tracks. The stored data can be read from a predetermined track of the disk 12 by moving the transducer 14 to a position where it is substantially centered on the predetermined track, while the disk 12 rotates below. The transducer 14 senses the data in the predetermined track to create an analog read signal at an output. The analog read signal is processed in the channel 22 where it is converted into a form that can be recognized by the host computer 32. The converted signal is then delivered to the host 32 via the interface 30 and associated cables.

The servo control unit 26 is operative for, among other things, providing a control signal to the VCM 20 for imparting controlled motion to the actuator arm 18 and, therefore, the transducer 14. Control of the positioning function is maintained through the use of a servo control loop. In this regard, the transducer may periodically read positioning information from the surface of the disk 12 and deliver the positioning information to the servo control unit 26 via the channel 22. The servo unit 26 then compares the present position of the transducer 14 to a desired position and drives the VCM 20 accordingly.

The controller unit 28 is operative for controlling the timing and operation of the other elements in the system 10. The controller unit 28 receives input/output requests from the host computer 32 via the interface unit 30, and carries out each request from the host 32 by delivering appropriate commands to the servo control unit 26 and the channel 22. For example, in response to a read request, the controller 28 may command the servo control unit 26 to move the transducer 14 to a desired track of the disk 12 so that data written on the track can be transferred to the host computer 32. The servo control unit 26 then moves the transducer 14 using the servo positioning information read by the transducer 14.

As described above, the recording channel 22 is operative for receiving the analog read signal from the transducer 14 and converting the signal to a form recognizable by the host computer 32. In this regard, the channel 22 may receive an alternating series of positive and negative analog pulses from the transducer 14 and convert the pulses to a series of ones and zeros that are properly timed and that represent the data originally stored on the disk 12. The channel may also provide a clock signal to accompany the data signal to the host so that the host may synchronize properly to the incoming data. In addition, the channel 22 may provide means for storing information from the host computer 32 to the disk 12. That is, the channel 22 may include encoding means for encoding the data signal from the host 32 and means for creating a write signal, to be delivered to the transducer 12, from the encoded data.

To perform the conversion of the analog read signal, the channel 22 normally has to perform multiple functions. For example, the channel 22 may perform detection functions, decoding functions, and timing recovery functions. Detection generally comprises separating the relevant information from the analog read signal and converting it to a digital form. In disk drives, for example, the detection function may be performed in any number of different ways, such as peak detection, partial response/maximum likelihood (PRML) detection, and/or decision feedback detection. After signal detection is performed, decoding of the detected signal must be done. Data signals are generally encoded multiple times before they are stored on a recording medium, for various purposes. The effects of this encoding must be removed from the read signal before the signal can be recognized by the host computer. Lastly, timing recovery functions must generally be performed in the channel to recover a clock signal from the analog read signal for use by the host in synchronizing to the read data. It should be appreciated that the functions performed by the channel in any particular data storage system will depend on the way the information is stored on and read from the medium in the particular system, i.e., the channel functions are medium specific.

Figure 2:
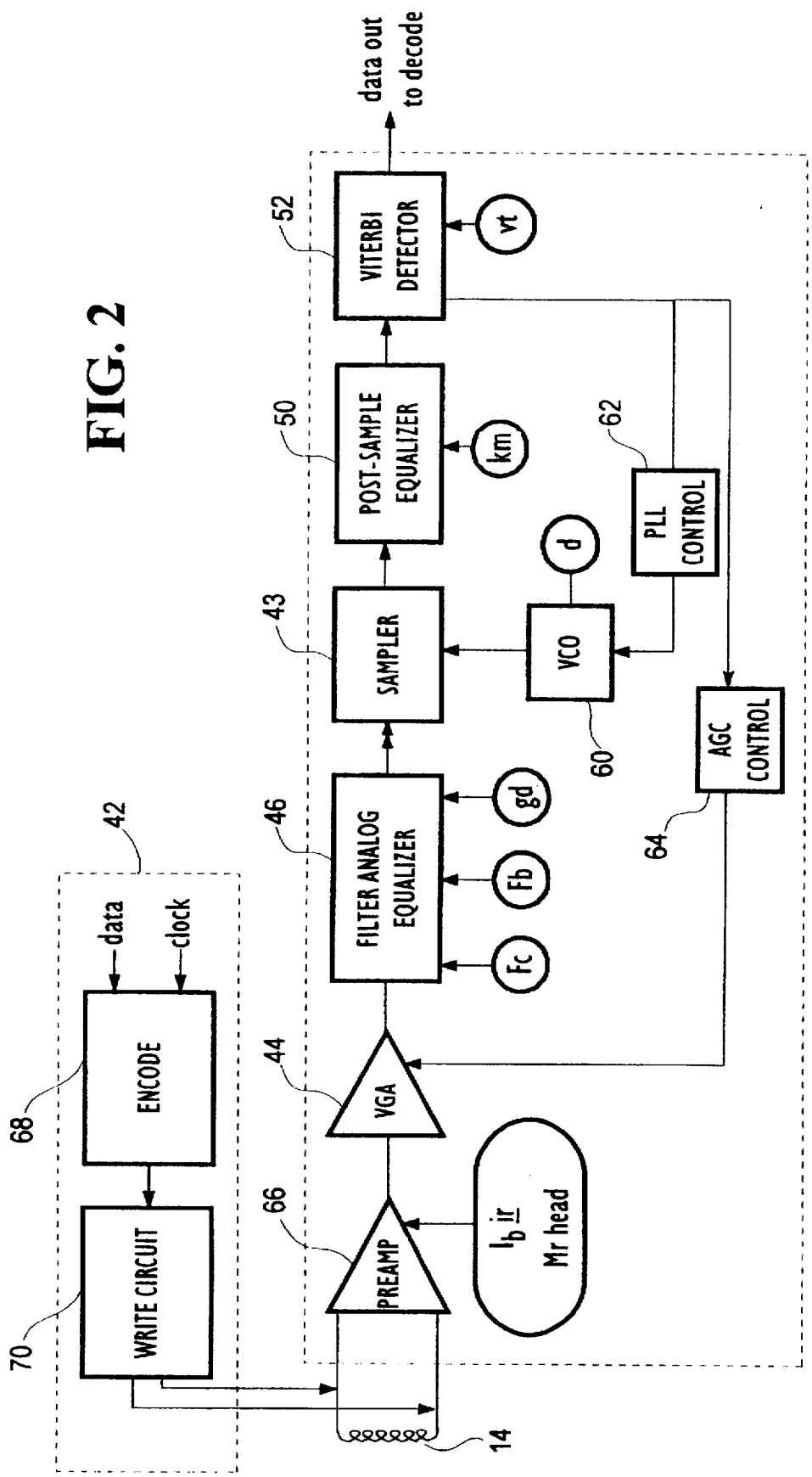
FIG. 2 is a block diagram illustrating portions of a recording channel, including a PRML unit, that is tuned in accordance with one embodiment of the present invention.

FIG. 2 is a block diagram illustrating channel components that may be located, for example, in the channel 22 of the system 10 of FIG. 1. More specifically, the channel components include a PRML unit 40 for performing the detection function and a write unit 42 for use during data transfer between the host computer and the data storage medium. As illustrated in FIG. 2, the PRML unit 40 includes: variable gain amplifier (VGA) 44, analog equalizer 46, sampler 48, post-sample equalizer 50, Viterbi detector 52, voltage controlled oscillator (VCO) 60, phase locked loop (PLL) control unit 62, and AGC control unit 64. In addition, the PRML unit 40 may include a preamplifier unit 66 to boost the analog read signal to an adequate level for processing. The write unit 42 includes an encoding means 68 and a write circuit 70.

In the PRML unit 40, the VGA 44 is operative for receiving the read signal from the preamplifier 66 and for further amplifying the signal based on a control signal from the AGC control unit 64. The AGC control unit 64 is a feedback unit that adjusts the level of the incoming read signal to a magnitude desired by the Viterbi detector 52 for optimal performance. The analog equalizer 46 receives the level adjusted read signal from the VGA 44 and filters it according to a desired filter response. The filtered signal is then sampled in accordance with a particular PRML protocol, such as PRML IV, required by the Viterbi detector 52. The samples are then equalized in the post sampling equalizer 50 and delivered to the Viterbi detector 52. The Viterbi detector 52 implements a maximum likelihood algorithm that produces a digital output stream that the samples received by the detector 52 are most likely to represent.

In the write unit 42, the data encoder 68 is operative for encoding data from the host computer 32 according to a predetermined encoding scheme. The encoded data is then converted to a write signal in the write circuit 70 before being delivered to the transducer 14 which writes the data to the medium.

Recording channels generally include a number of adjustable parameters that affect the performance of the corresponding data storage system. The optimal values for these parameters generally vary from disk drive to disk drive and, within a particular disk drive, from track to track, zone to zone and/or head to head. In this regard, tuning is generally performed during the manufacturing process to determine parameter values for each manufactured drive that produce acceptable system performance. That is, channel parameter values are found for each disk drive that allow the disk drive to equal or exceed a minimal desired performance criterion that may include, for example, a minimum acceptable bit error rate. A separate set of parameter values may be found for each disk, zone, track, or head in the disk drive. The channel parameter values may then be stored in a memory and retrieved by a controller unit when a corresponding disk, zone, or track of the disk drive is accessed. The retrieved channel parameter values are then transferred by the controller unit to the channel before any data transfer takes place between the disk and the host.

As described above, the present invention provides a method and apparatus for rapidly tuning channel parameter values in a data storage system. The invention may be resident within the data storage system (such as being implemented in firmware within the controller 28 of the disk drive system 10 of FIG. 1) or it may be located external to the data storage system (such as in an dedicated test stand). The invention is intended for use primarily during the disk drive manufacturing process, but may be used anytime during the life of a data storage system to tune the channel parameters therein. The invention tunes the parameter values using an adaptive process based on the principles of simulated evolution. The invention generates an initial population of "individuals", each individual comprising a parameter value string having a value for each of a plurality of channel parameters. Each string in the initial population is applied to the channel and a fitness value is calculated based on the performance of the disk drive using the associated channel parameter values. Individuals are chosen from the initial population for mating purposes based on the calculated fitness values. The chosen individuals are then manipulated using genetic operators to produce a new population of parameter value strings. The genetic cycle is then repeated until a predetermined condition is met.

Figure 3A:
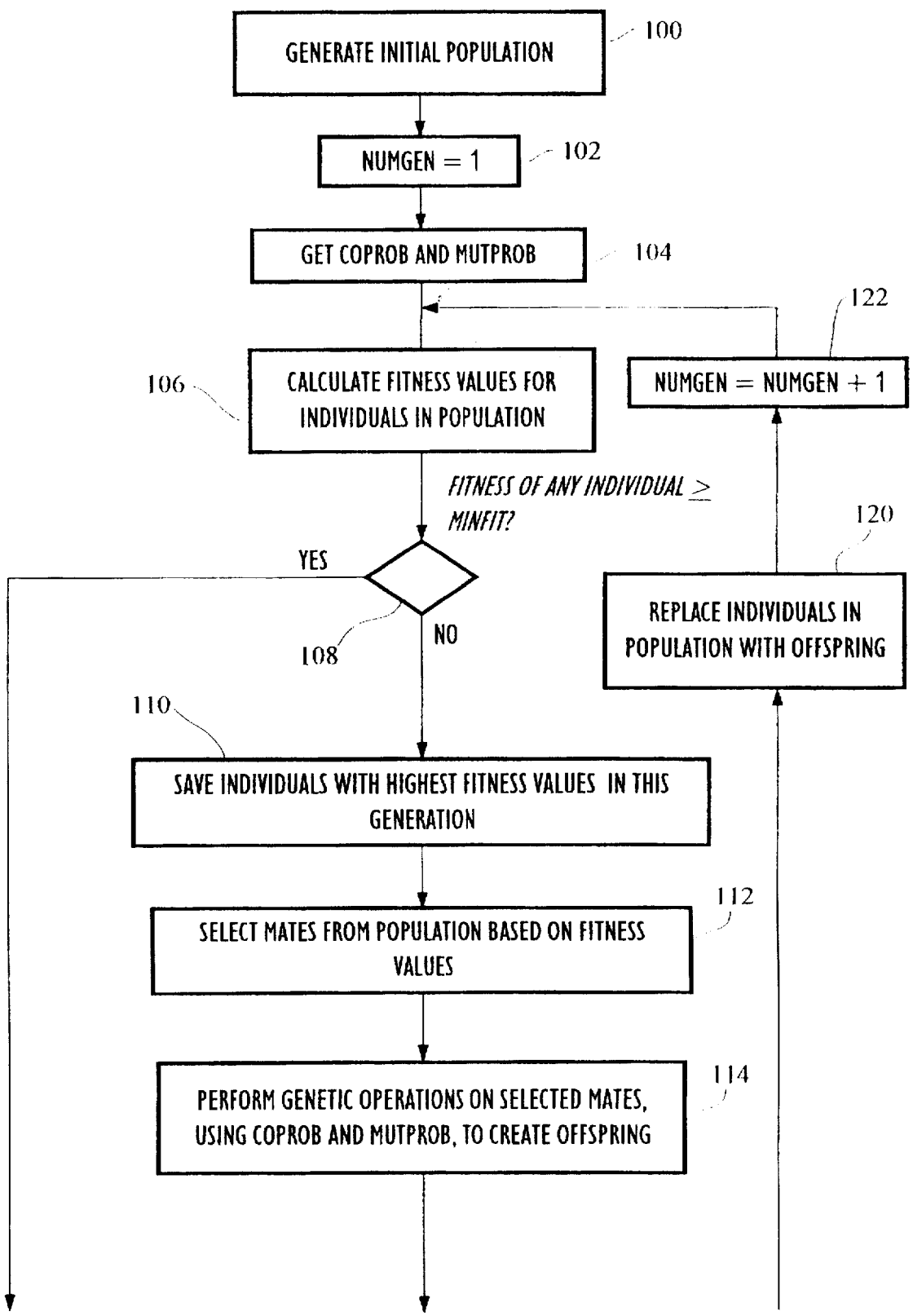
FIGS. 3A and 3B are portions of a flowchart illustrating the steps of a tuning procedure in accordance with one embodiment of the present invention.
Figure 3B:
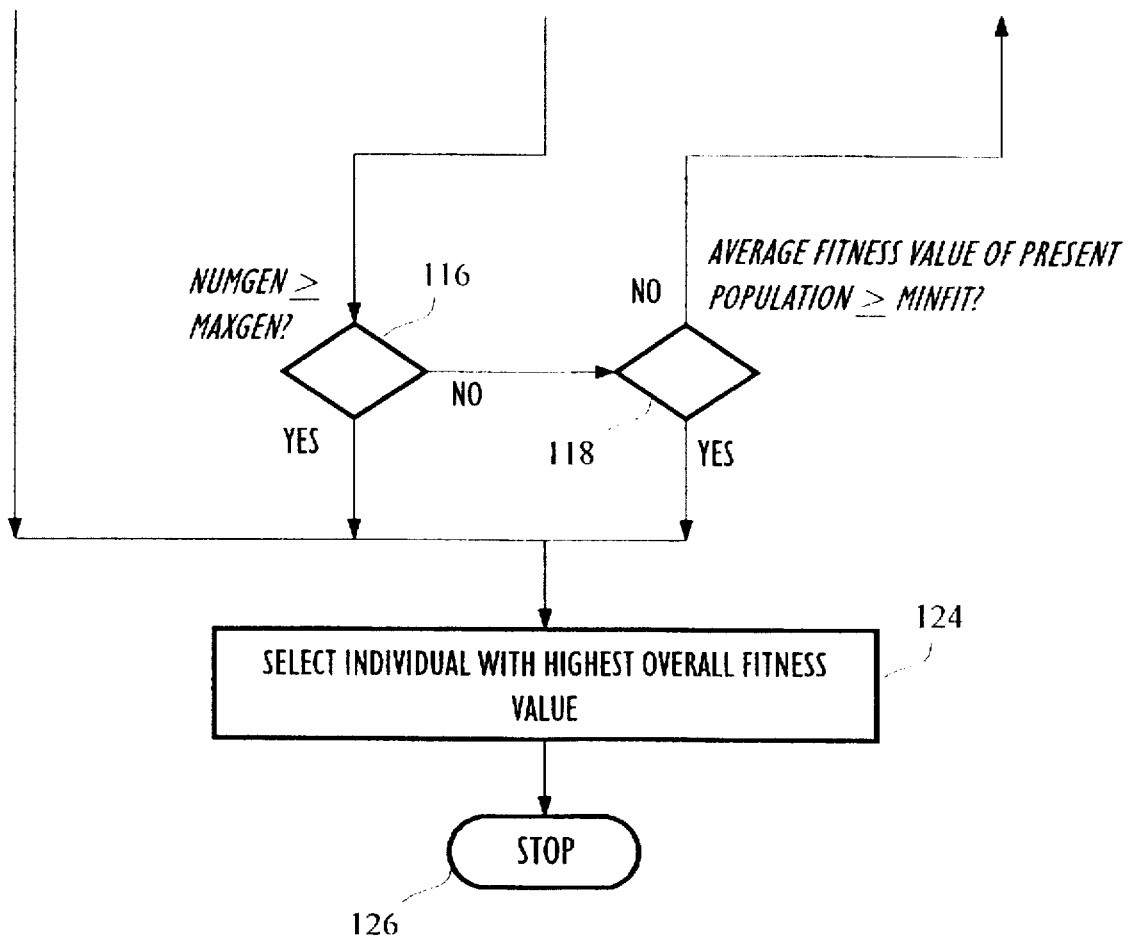

FIGS. 3A and 3B are portions of a flowchart illustrating the steps followed to tune a single production disk drive in accordance with one embodiment of the present invention. In step 100, an initial population of individuals is generated. Each individual comprises a data bit string (i.e., a chromosome) having a value (i.e., a gene) for each of a plurality of channel parameters. In general, any channel parameter that is adjustable and that effects the performance of the channel may be chosen for inclusion in the chromosome. For example, if the channel components of FIG. 2 are tuned using the techniques of the present invention, each chromosome may include a value (i.e., a gene) for each of the following channel parameters: write current (Iw) and write precompensation (wpc) in the write circuit 70; read bias current (Ib) in the preamplifier 66 (if a magnetoresistive head is used); boost (Fb), cutoff frequency (Fc), and group delay (gd) in the analog equalizer 46; outer tap coefficient (km) in the post sample adaptive equalizer 50; Viterbi threshold (Vt) in the Viterbi detector 52; and damping gain (d) in the VCO 60.

Figure 4:
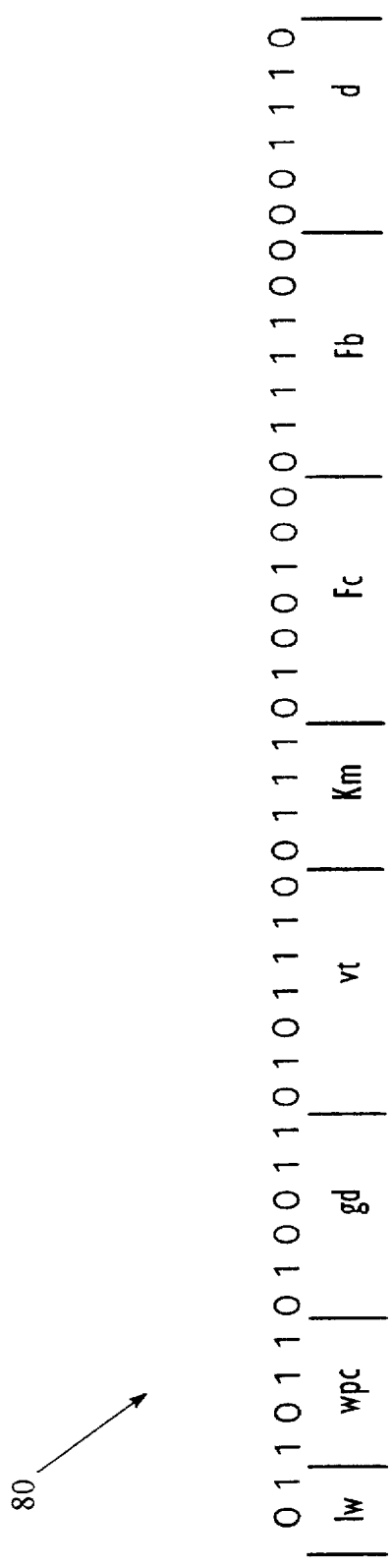
FIG. 4 is a diagram illustrating a chromosome (i.e., a parameter value bit string) that is used in a tuning procedure in accordance with one embodiment of the present invention.
Figure 7A:
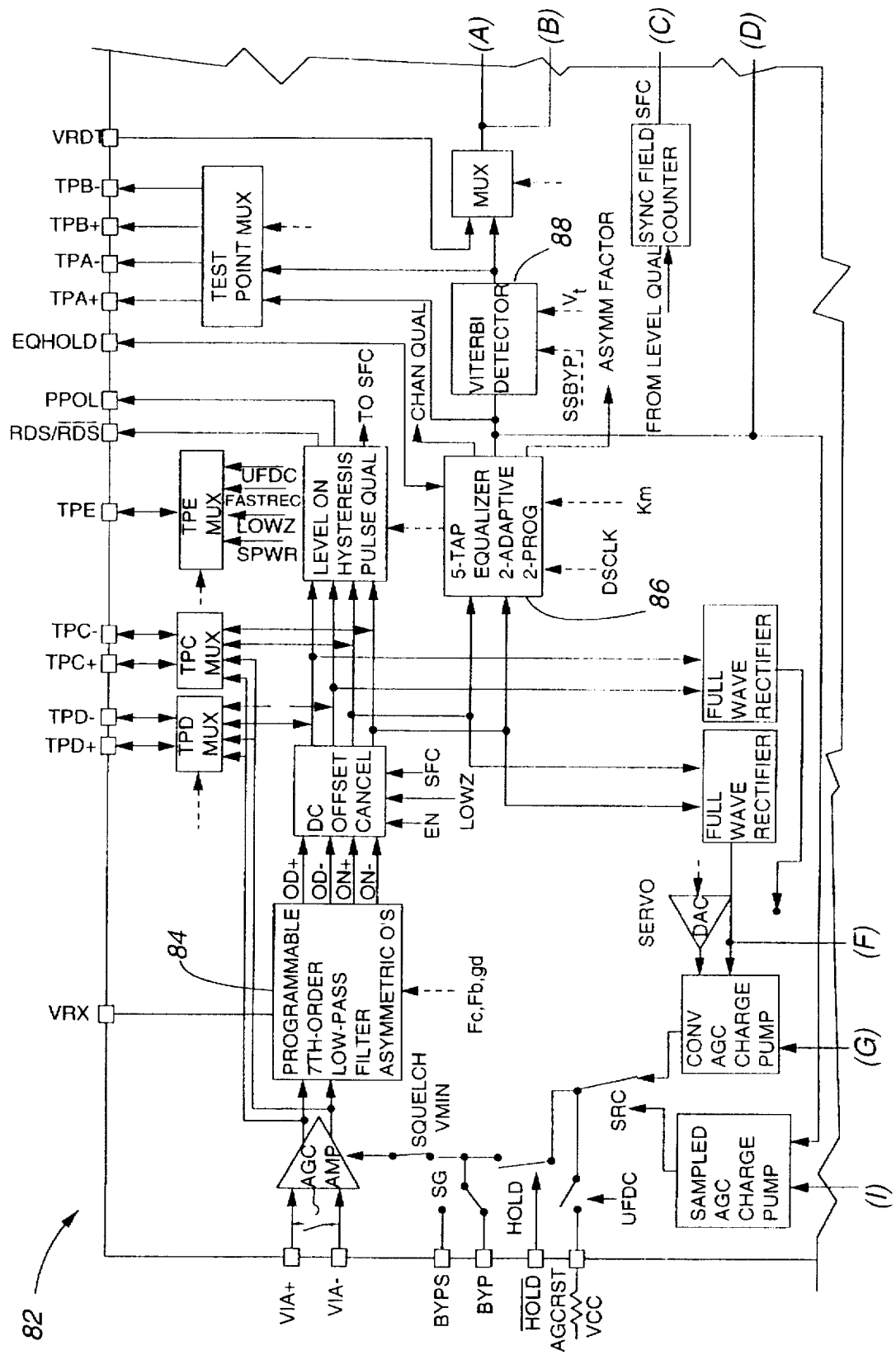
FIG. 7 is a block diagram illustrating a commercially available PRML unit that was tuned in accordance with one embodiment of the present invention.
Figure 7B:
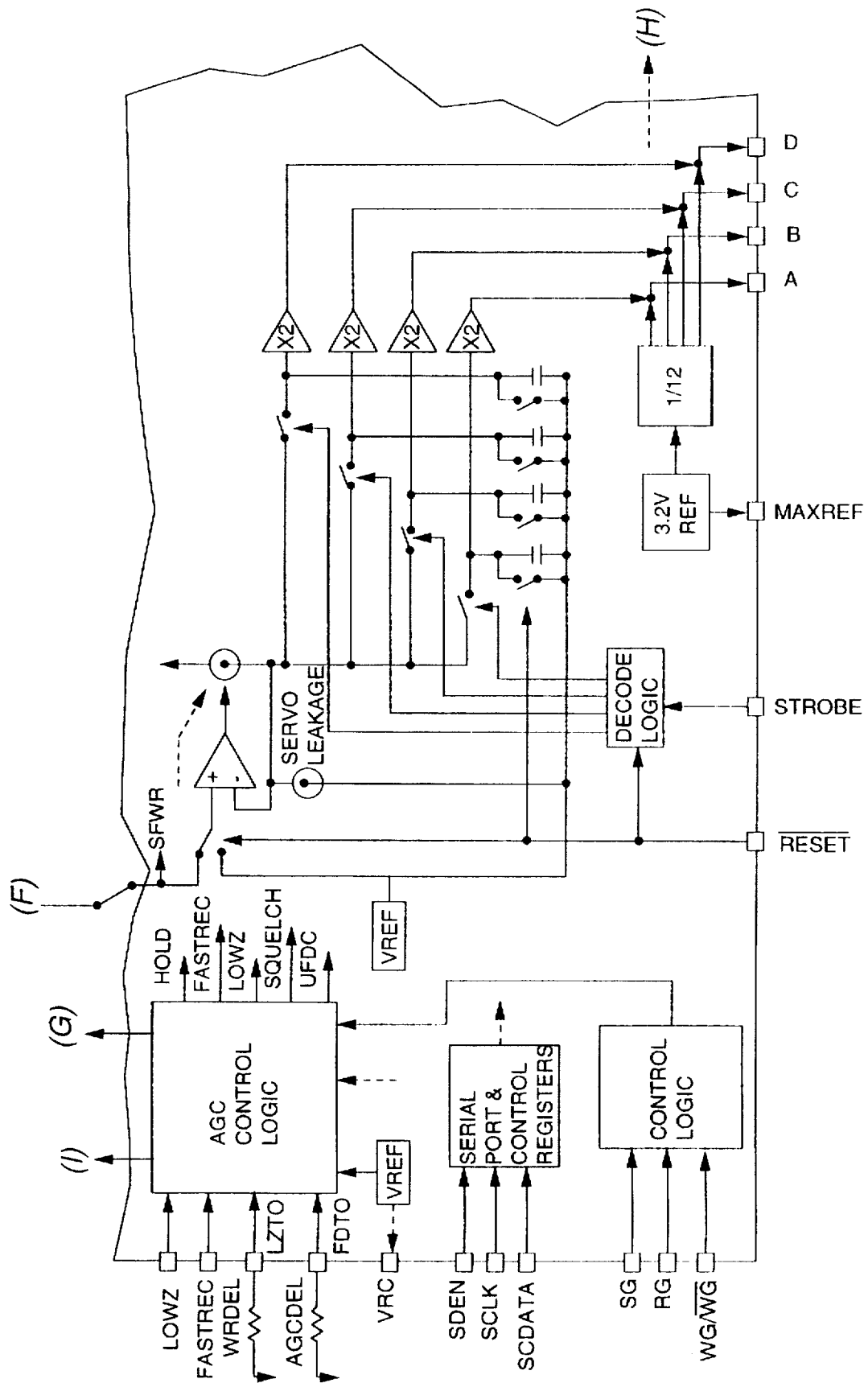
Figure 7C:
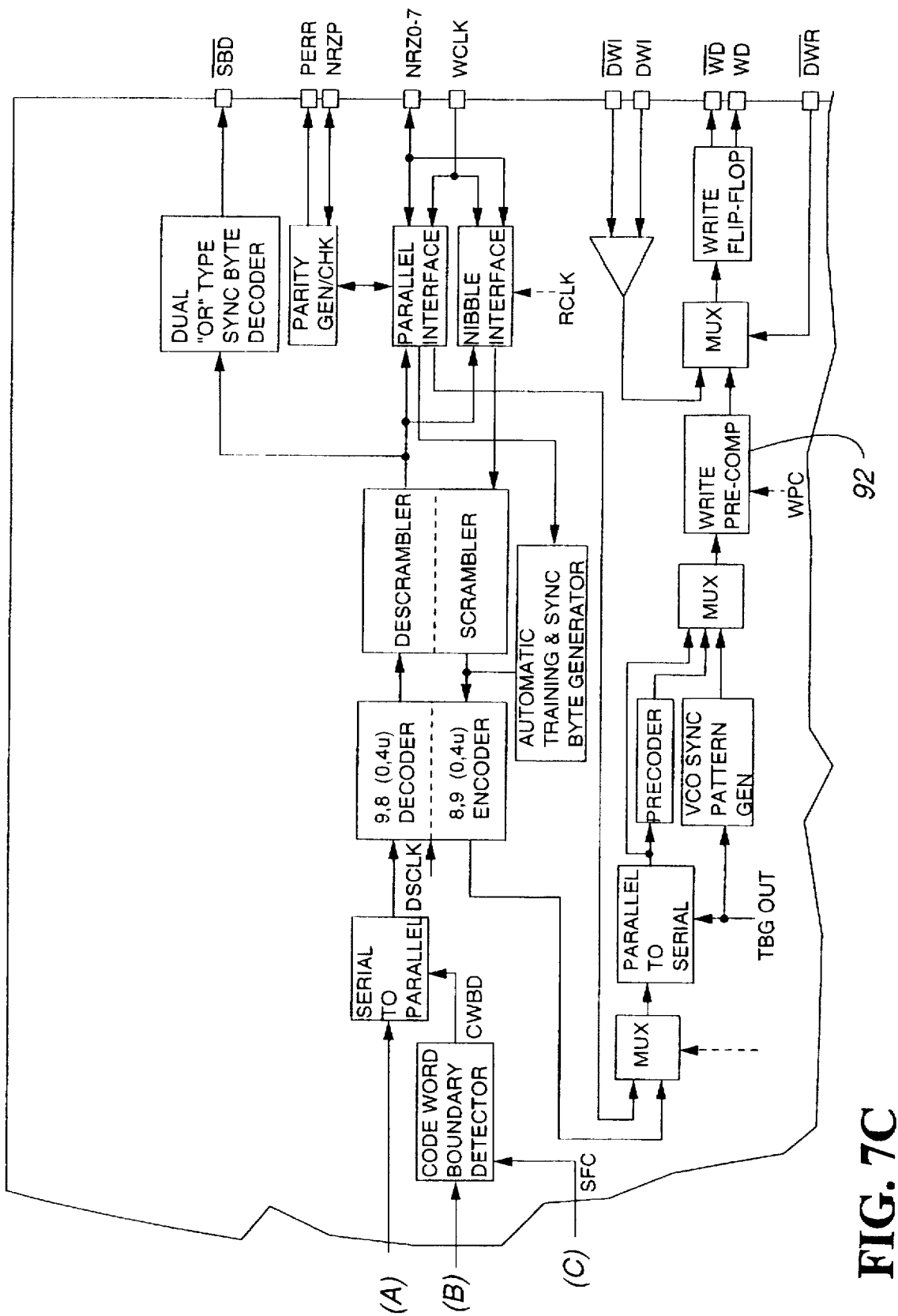
Figure 7D:
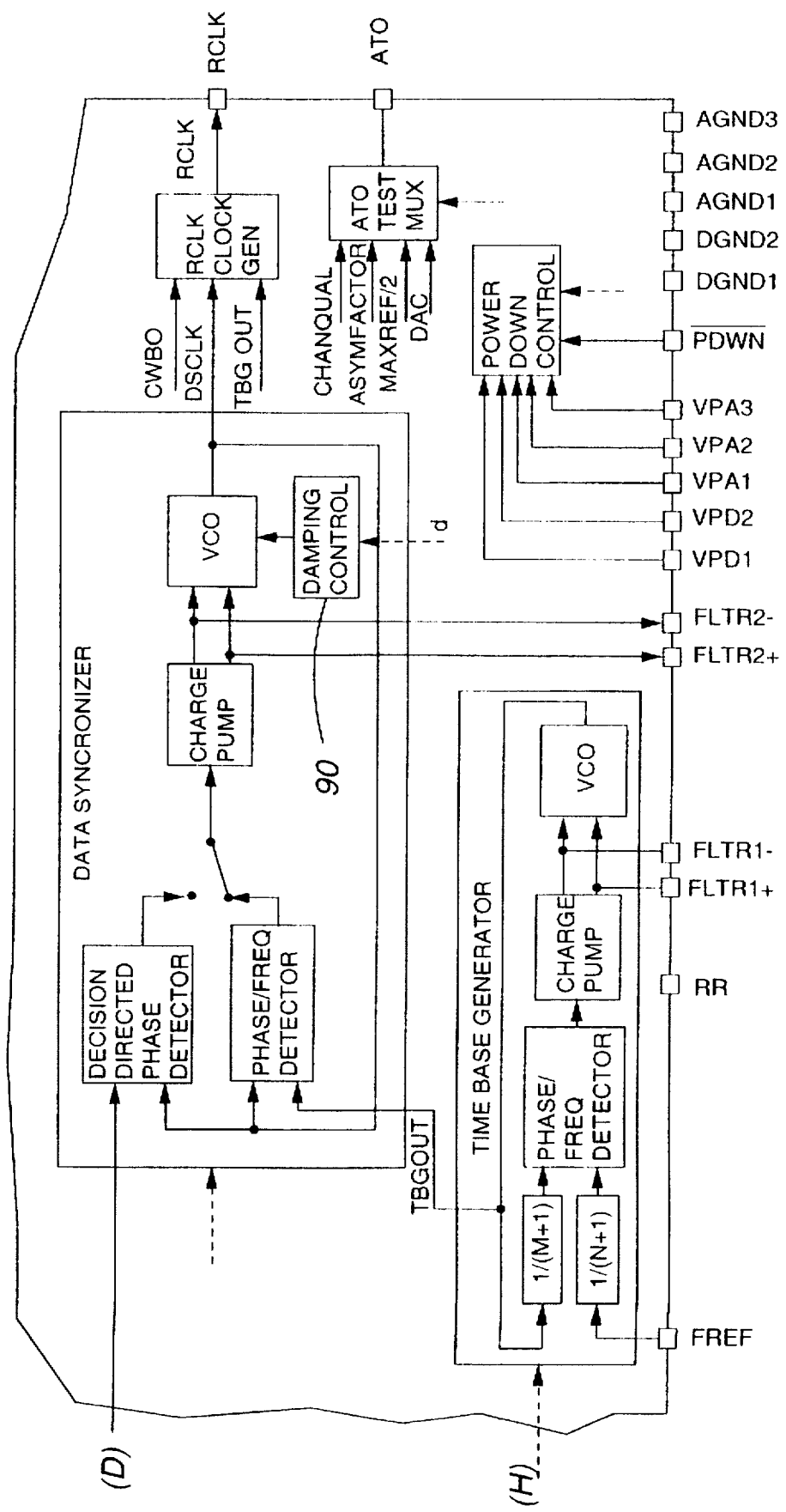

FIG. 4 illustrates a typical chromosome 80 that may be used in accordance with the present invention. As shown, the chromosome 80 is a binary bit string divided into a plurality of portions (i.e., genes), wherein each portion represents one of a plurality of channel parameters. Each portion includes a fixed number of binary bits representing a value for the corresponding channel parameter. For convenience purposes, mapping may be used so that the actual binary value of each portion of the binary bit string is different from the channel parameter value it represents. If mapping is used, the genes in the chromosome 80 have to be decoded before being applied to the channel 22. The number of data bits used for each gene is dependant upon the resolution required for each of the parameters. For example, if up to 16 (i.e., $2^4$) separate levels are desired for a given parameter value then 4 data bits are required, if up to 32 (i.e., $2^5$) separate levels are desired then 5 data bits are required, etc.

The initial population of individuals can be generated in a number of different ways. For example, in one embodiment of the present invention, the individuals in the initial population are randomly generated. That is, random numbers are generated for each of the gene values in each of the chromosomes of the initial population. In another embodiment, the individuals in the initial population are determined based upon parameter value ranges that have a higher likelihood of producing better system performance. The parameter value ranges may be determined based on manual runs or factory data. For example, it may be found through experimentation that write precompensation (wpc) values between 0100 and 1100 are more likely to result in a desired performance level than wpc values outside of this range. The initial population, therefore, can be generated so that only values in the desired ranges are used (e.g., random gene values that are restricted to the desired ranges can be generated). By "seeding" the initial population in this way, convergence time can be reduced considerably.

In one embodiment of the present invention, default gene values and range values are used in generating the initial population in step 100. The default values may represent, for example, nominal or average tuned values for each of the channel parameters derived over a large number of production units. During the generation of the initial population, the default gene values and range values are retrieved from a memory internal to the disk drive or in an external tester unit. The default gene values are assembled to form a first individual in the initial population. Actual ranges are then defined for the gene values for the remainder of the individuals in the initial population based on the default values and the default ranges. For example, in one embodiment, actual ranges for each gene value are defined as a fixed percentage of the corresponding default range above and below the default value. That is, if the default value for a particular gene is 20, the default range is 10, and the fixed percentage is 25%, the actual range is 20±2.5 (i.e., from a lower limit of 17.5 to an upper limit of 22.5). After actual ranges are defined, gene values are randomly generated within the defined ranges for use in the initial population. In one embodiment, multiple actual ranges are defined for each gene value by using multiple fixed percentages. In this case, a portion of the initial population will be generated using a first set of gene ranges and another portion will be generated using a second set of gene ranges. If a defined actual range exceeds the possible range for a given parameter (i.e., if a range extends below zero or above a maximum possible value for a given number of binary bits), then the range is truncated before the random gene values are generated.

In step 102 of the flowchart of FIG. 3A, a variable NUMGEN is initialized to a value of one. The NUMGEN variable is used to track the number of population generations that have been created during the tuning process. In step 104, values are retrieved for the variables COPROB and MUTPROB. These variables represent the probabilities that specific genetic operations (i.e., crossover and mutation, respectively) will be performed during the tuning process. The variable values can be stored in a nonvolatile memory in the disk drive or a separate tester unit or a user may be prompted for the values each time a tuning procedure is initiated. It should be appreciated that the present invention may perform genetic operations other than crossover and mutation, in which case other probability values may be retrieved.

In step 106, fitness values are calculated for each of the individuals in the current population. A fitness value is a value indicative of the performance of the data storage system, as measured by a specific performance criterion, when the parameter values associated with a specific individual are applied to the channel 22. That is, to determine a fitness value, the parameters in the channel 22 are set to values corresponding to the genes in a particular individual, a performance criterion (such as bit error rate) is measured for the data storage system, and the measured performance criterion is used to create a corresponding fitness value. It is a primary goal of the invention, to find a group of channel parameter values that produce a desired fitness value or better (i.e., the data storage system, using the group of values, meets or exceeds a minimal fitness value).

In one embodiment of the present invention, the fitness values are calculated based on a ratio between a measured bit error rate (BER) and a desired BER. In another embodiment of the invention, fitness values are calculated based on a weighted combination of the average BER over multiple measurements, the slope of the BER, and the standard deviation of the multiple BER measurements. The weight given to the average BER is normally greater than the weight given to the other two elements. The weight given to the BER slope is generally chosen to move the optimization process away from steep slopes. The weight given to the BER standard deviation is chosen to minimize the standard deviation and hence move away from channel settings that have high domain pinning or other related problems. It should be understood that the performance criterion used to calculate the fitness values can include any measurable performance criterion for the channel and is not limited to BER.

Because measured BER is generally very low when taking measurements on-track, the BER used for fitness calculation can be measured with the transducer off-track by a predetermined percentage. This effectively increases the BER during a read operation to a level that can be reliably detected without having to read an onerous number of data bits. In addition, a predetermined interference pattern can be written in proximity to the subject track before the BER measurement is performed to further increase the possibility of read error.

Before the parameter values associated with a particular individual may be applied to the channel, the binary values must be converted to values that are recognizable by the channel component receiving the value. For example, the VCO 60 may not be able to recognize the 7-bit binary damping gain (d) value in the chromosome, in which case the binary value must be converted to an analog or digital form that is familiar to the VCO 60 before being delivered to the VCO 60. The invention, therefore, may require means for decoding the parameter values associated with each of the individuals. In general, any known method of performing the required encoding/decoding can be utilized.

After fitness values are calculated for each of the individuals in the initial population, the fitness values are checked, in step 108, to determine whether any of them equal or exceed a minimum desired fitness value (i.e., MINFIT). The MINFIT value represents the minimum acceptable performance of the data storage system being tuned. If any of the fitness values equal or exceed MINFIT, the tuning process jumps to step 124 and the individual having the highest fitness value is selected. The tuning process is then terminated in step 126 and the channel parameter values corresponding to the selected individual are stored for later use by the channel. In another embodiment of the invention, the highest fitness value is first compared to the fitness value achieved using the default channel parameter values and, if the highest fitness value is within one standard deviation of the fitness value achieved using the default values, then the default channel parameter values are selected rather than the values associated with the highest fitness value.

If none of the individuals in the initial population are of the requisite fitness, a predetermined number of individuals having the highest fitness values in this generation are stored in a memory along with their fitness values in step 110. In one embodiment of the present invention, three individuals are stored for each generation.

In step 112, individuals from the initial population are chosen for mating (i.e., reproduction) based upon the calculated fitness values. The chosen individuals represent the "parents" that will be operated upon to create a new generation of individuals. In one embodiment of the present invention, the probability that a particular individual will be chosen for mating is proportional to the fitness value of the individual (i.e., survival of the fittest). In this embodiment, a "roulette wheel" selection process may be utilized wherein the bins of the roulette wheel are proportional in length to the fitness of a corresponding individual. To implement the roulette wheel, the following steps can be followed. First, calculate the sum of the fitness values for all of the individuals in the present population. Then, assign a unique range of values to each of the individuals in the present population, wherein each range occurs in the interval between one and the calculated sum and has a length equal to the fitness value for the corresponding individual. Next, generate a plurality of random numbers between one and the calculated sum, wherein the number of random numbers in the plurality is equal to the number of individuals that are to be selected for mating purposes. Then, select a separate individual for mating purposes based on the range in which each of the random numbers falls, i.e., if a random number falls in a range corresponding to a particular individual, then that individual is chosen for mating purposes. Using the above procedure, a single individual may be chosen for mating more than once and may be chosen to mate with itself.

After individuals are selected for mating, genetic operations are performed on the selected individuals to create offspring in step 114. A first of the genetic operations is known as a crossover operation and comprises swapping a portion of a first selected individual with a corresponding portion of a second selected individual. The portions of the individuals that are swapped may be chosen randomly. For example, in one embodiment of the present invention, as illustrated in FIG. 5, a random number is generated between one and the length of a chromosome. The crossover point is then chosen after the bit position corresponding to the random number (e.g., the random number chosen in the example of FIG. 5 is four). The portions before (or after) the crossover point in each of the selected individuals (i.e., A1 and B1) are then swapped to create a pair of new individuals or offspring (i.e., A2 and B2).

A crossover point may be randomly generated before each crossover operation in the tuning process or a single crossover point can be initially generated and used repeatedly during the tuning process. Alternatively, a particular crossover point may be found empirically to produce enhanced convergence times in the tuning of the channel parameters in a particular disk drive design and hence be used exclusively in the tuning of these drives. As described previously, the performance of a crossover operation on a given pair of selected individuals is based on probability. That is, after mating pairs have been selected, the probability that crossover will be performed on a particular pair is controlled by the value of the COPROB variable.

Figure 6:
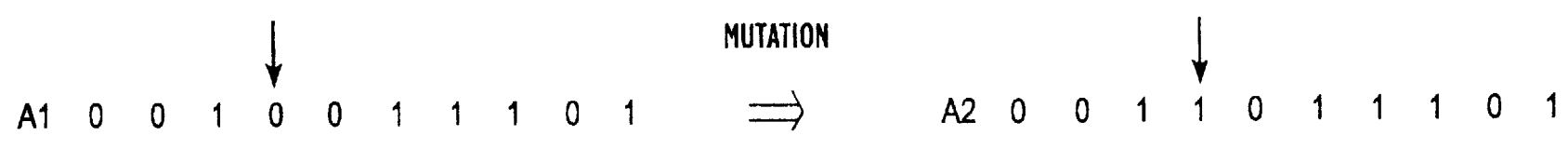

A second of the genetic operations is known as mutation. As illustrated in FIG. 6, mutation generally comprises the toggling of one or more of the bits in a single individual. In one embodiment of the present invention, mutation is performed on a bit by bit basis on each of the selected individuals. That is, a random number is generated for each of the bits in a particular individual. If the random number falls within a first range, the corresponding bit is toggled. Otherwise, if the random number falls within a second range, the corresponding bit is not changed. The probability that a particular bit will be toggled is set by adjusting the size of the first and second ranges. For example, if the random number is limited to the region between 0 and 1, then the first range can be from zero to 0.05 and the second range can be from 0.05 to 1. This results in a one in twenty chance that a particular bit will be toggled (i.e., mutated). The ranges will generally be set in accordance with the MUTPROB variable discussed previously. If, after the genetic operations have been performed, two of the members of the new generation are identical, then mutation can again be performed on one of the two individuals until the individual is a unique member of the new population. It should be appreciated that genetic operations other than those described above, such as dominance and genetic edge recombination, may be performed in accordance with the present invention. It should also be appreciated that the genetic operations can be performed in any order, although in a preferred embodiment of the present invention, crossover is performed before mutation.

After the offspring have been created, tests are performed in steps 116 and 118 to determine whether the tuning process should continue. During a first test, in step 116, the NUMGEN variable value is compared to a MAXGEN constant representing the maximum number of generations to be created during the tuning process. The maximum number of generations can be, for example, a user specified value or a stored constant and generally represents an empirically derived value. If NUMGEN equals or exceeds MAXGEN, then the individual with the highest overall fitness value is selected 124 and the tuning process is terminated 126. In one embodiment of the present invention, the individual with the highest overall fitness value is selected from all of the values saved in step 110 in the flowchart of FIG. 3A. In another embodiment, the fittest individual is selected from the final generation.

If NUMGEN is less than MAXGEN, then a second test is performed. During the second test, the average fitness value of the present population is compared to the minimal desired fitness level, MINFIT 118. If the average fitness value equals or exceeds MINFIT, then the individual with the highest overall fitness value is selected 124 and the tuning process is terminated 126. If the average fitness value is less than MINFIT, then the individuals in the present population are replaced by the offspring to create a new population 120 (i.e., the next generation). Accordingly, the NUMGEN index is incremented by one 122 and the tuning cycle is repeated for the new population. The tuning procedure will continue until one of the termination criterion are met.

In accordance with the present embodiment, any one or more of the testing steps 108, 166, 118 may be deleted or changed based on the goals of the particular tuning process. For example, if a maximum possible fitness value is desired, step 118 can be eliminated and the MAXGEN value of step 116 and the MINFIT value of step 108 can be set to very high values. Alternatively, if a minimal tuning time is desired, than the MINFIT value can be made as low as possible.

Because optimal channel parameter values differ depending upon the area of the medium which is being accessed, the above procedure is generally performed for each track or zone in the data storage system. The optimal values derived from using the procedure may then be stored in a memory and retrieved whenever the corresponding track or zone is accessed. Alternatively, the process may be performed for less than all of the tracks or zones on the medium. In this case, the same parameter values can be used in multiple tracks or zones or scaling can be used to calculate the missing parameter values.

The present invention has been tested for use in tuning an SSI 32P4910 PRML Read Channel with PR4 (FIG. 7). As illustrated in FIG. 7, the parameters that are tuned are: boost (Fb), cutoff frequency (Fc), and group delay (gd) in the programmable low pass filter 84; outer tap coefficient (km) in the three tap equalizer 86; Viterbi threshold (Vt) in the Viterbi detector 88; damping gain (d) in the damping control unit 90, and write precompensation (wpc) in the write precomp unit 92. In some cases, using the principles of the present invention has led to convergence in 40 test iterations or less. This is in contrast to the 2187 test iterations required by the brute force method in one instance. It is conceivable that the method and apparatus of the present invention could eventually reduce parameter value optimization times for an entire data storage apparatus from multiple hours to a matter of minutes.

Figure 8:
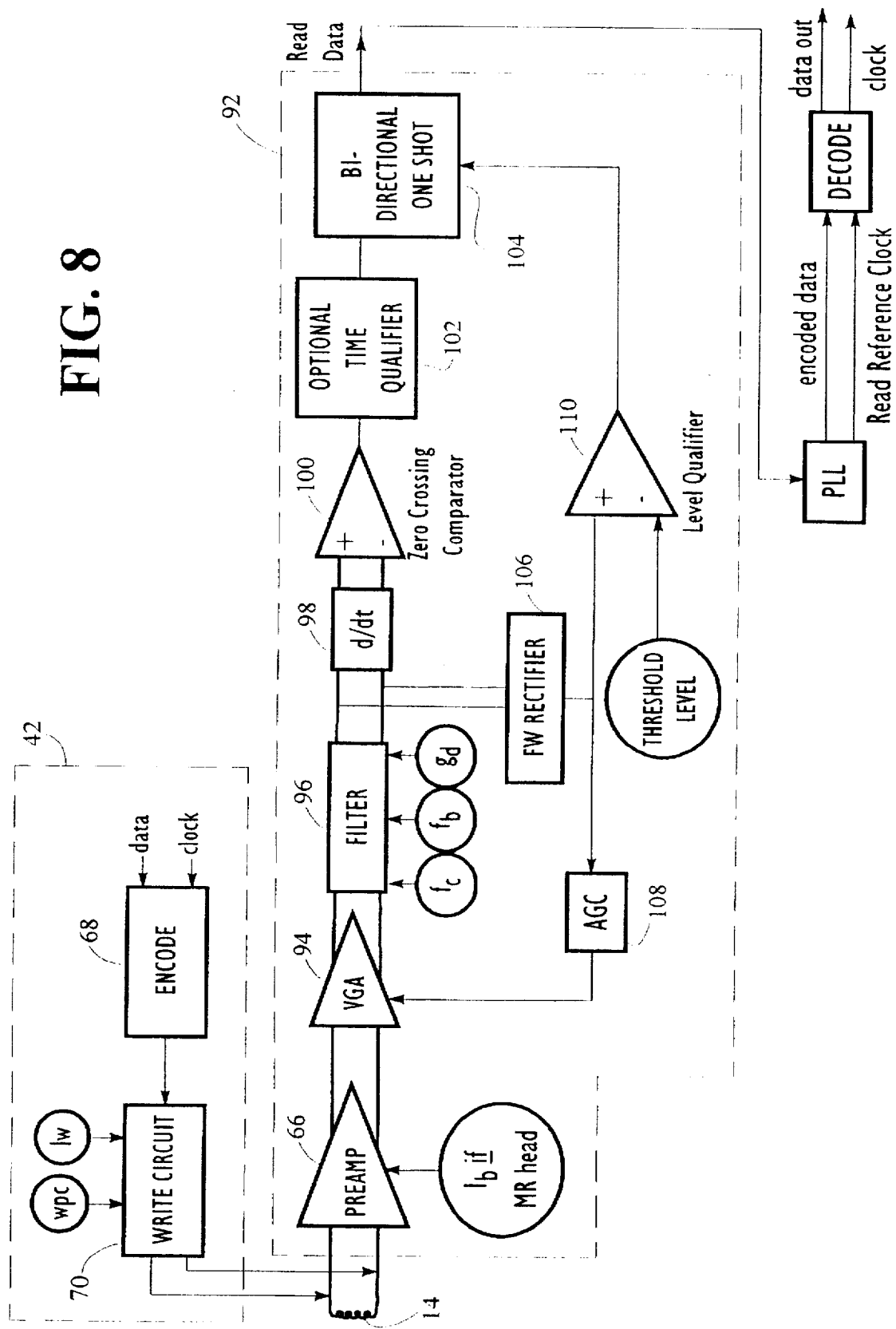
FIG. 8 is a block diagram illustrating portions of a recording channel, including a peak detection unit, that may be tuned in accordance with one embodiment of the present invention.

As described previously, the present invention may be used to tune parameters in virtually any type of recording channel. For example, FIG. 8 illustrates a channel having a peak detection unit 92 that may be tuned according to the principles of the present invention. As illustrated, the peak detection unit 92 includes: VGA 94, filter 96, differentiator 98, zero cross comparator 100, time qualifier 102, bidirectional one-shot 104, full wave rectifier 106, AGC unit 108, and level qualifier comparator 110. In addition, the peak detection unit 98 includes a preamplifier similar to the one illustrated in FIG. 2 for use in PRML unit 40. The channel of FIG. 8 also includes a write unit 42 similar to the one illustrated in FIG. 2. Some of the parameters that may be tuned in the channel of FIG. 8 include: write current (Iw) and write precompensation (wpc) in the write circuit 70; read bias current (Ib) in the preamplifier 66 (if a magnetoresistive head is used); boost (Fb), cutoff frequency (Fc), and group delay (gd) in the filter 96; and threshold level in the level qualifier comparator 110. Other parameters may also be tuned.

Although the present invention has been described in conjunction with a preferred embodiment, it is to be understood that modifications and variations may be resorted to without departing from the spirit and scope of the invention as those skilled in the art readily understand. For example, the invention may be used to tune channel parameter values in virtually any type of data storage system using any read channel, such as optical storage systems, and is not limited to use in magnetic data storage systems. Such modifications and variations are considered to be within the purview and scope of the invention and the appended claims.

What is claimed is:

1. A data storage device, comprising:

a storage medium;

a channel for use in transferring data between said storage medium and an exterior environment, said channel using a generic process having a plurality of adjustable parameters;

means for use in tuning said adjustable parameters of said channel, said means for use in tuning comprising:

means for determining a first set of channel parameter values;

means for applying said first set of channel parameter values to said channel;

means for determining fitness value for said first set of channel parameter values based on the performance of said data storage device using said first set of channel parameter values, said fitness value being indicative of the desirability of said first set of channel parameter values; and means for determining a second set of channel parameter values based on said fitness value.

2. The device, as claimed in claim 1, wherein:

said channel includes at least one of the following: a PRML channel, a peak detector, and a decision feedback channel.

3. The device, as claimed in claim 1, wherein:

said means for determining said first set of channel parameter values determines said first set randomly.

4. The device, as claimed in claim 1, wherein:

said means for determining said first set of channel parameter values determines said first set based on a probability that said determined values will produce a better fitness value than randomly selected parameter values.

5. The device, as claimed in claim 1, wherein:

said means for calculating a fitness value includes means for measuring a bit error rate (BER) value for said channel using said first set of channel parameter values, wherein said BER value is indicative of a number of errors produced in transferring data between said storage medium and an exterior environment using said channel.

6. The device, as claimed in claim 5, wherein:

said fitness value includes a ratio between a measured BER value and a desired BER value.

7. The device, as claimed in claim 5, wherein:

said fitness value includes a weighted combination of at least two of the following: a measured BER value, a standard deviation between multiple measured BER values, and a BER slope value.

8. The device, as claimed in claim 1, wherein:

said first and second set of channel parameter values each include a plurality of parameter value strings, wherein each string includes a value for each of a plurality of predetermined parameters.

9. The device, as claimed in claim 8, wherein:

said means for calculating a fitness value for said first set of channel parameter values calculates a fitness value for each of said plurality of parameter value strings.

10. The device, as claimed in claim 9, wherein:

said means for determining said second set of channel parameter values includes means for selecting parameter value strings from said first set of channel parameter values based on corresponding fitness values.

11. The device, as claimed in claim 10, wherein:

said means for selecting selects said parameter value strings based on probability.

12. The device, as claimed in claim 11, wherein:

the probability that a parameter value string will be selected by said means for selecting is approximately proportional to a corresponding fitness value.

13. The device, as claimed in claim 10, wherein:

said means for determining said second set of channel parameter values further includes means for altering said selected parameter value strings.

14. The device, as claimed in claim 13, wherein:

said means for combining includes means for performing a genetic operation on said selected parameter value strings.

15. The device, as claimed in claim 14, wherein:

said genetic operation includes one or more of the following: a crossover operation wherein a portion of a first selected parameter value string is switched with a corresponding portion of a second selected parameter value string and a mutation operation wherein at least one digit in a selected parameter value string is changed to a different value.

16. A method for tuning a channel in a data storage device using a generic process, wherein said channel transfers data between a storage medium and an exterior environment, said method comprising:

providing a channel having a plurality of adjustable parameters;

determining a first set of channel parameter values;

applying said first set of channel parameter values to said channel;

calculating at least one fitness value for said first set of channel parameter values based on the performance of said data storage device using said first set of channel parameter values, said fitness value being indicative of the desirability of said first set of channel parameter values; and determining a second set of channel parameter values based on said fitness value.

17. The method, as claimed in claim 16, further comprising the step of:

repeating said steps of applying, determining at least one fitness value, and determining for a plurality of successive channel parameter value sets, wherein each of said channel parameter value sets are generated in a previous determining step.

18. The method, as claimed in claim 16, wherein:

said step of determining a first set of channel parameter values includes using a plurality of default values.

19. The method, as claimed in claim 18, wherein:

said step of using includes periodically updating said plurality of default values based on information relating to channel parameter values determined for other data storage devices.

20. A method for tuning a channel in a data storage device, wherein said channel transfers data between a storage medium and an exterior environment, said method comprising the steps of:

providing a plurality of parameter value strings, each parameter value string including a value for each of a plurality of predetermined channel parameters;

first determining fitness values for parameter value strings in said plurality;

genetically altering selected parameter value strings in said plurality of parameter value strings to create a modified plurality of parameter value strings;

second determining fitness values for parameter value strings in said modified plurality; and choosing a parameter value string that produces a best fitness value.

21. The method, as claimed in claim 20, further comprising the step of:

repeating said steps of genetically altering and second determining until a predetermined criterion has been satisfied.

22. The method, as claimed in claim 20, wherein:

said step of providing a plurality of parameter value strings includes randomly generating said parameter value strings.

23. The method, as claimed in claim 20, wherein:

said step of providing a plurality of parameter value strings includes generating said parameter value strings using parameter value ranges that are more likely to produce better fitness values than randomly generated parameter values.

24. The method, as claimed in claim 20, wherein:

said step of first determining includes applying said parameter value strings to said channel and measuring a performance characteristic of said channel.

25. The method, as claimed in claim 20, wherein:

said step of genetically altering includes the step of selecting parameter value strings from said plurality of parameter value strings based on fitness values found in said step of first determining.

26. The method, as claimed in claim 20, wherein:

said step of genetically altering includes the step of determining whether any genetically altered parameter value strings are identical to any other genetically altered parameter value strings and, if so, performing a mutation operation on at least one of the identical strings.

27. The method, as claimed in claim 20, wherein:

said step of genetically altering includes the step of performing genetic operations on said selected parameter value strings.

28. The method, as claimed in claim 27, wherein:

said step of performing genetic operations includes performing one or more of the following operations: a crossover operation wherein a portion of a first selected parameter value string is switched with a corresponding portion of a second selected parameter value string and a mutation operation wherein at least one digit in a selected parameter value string is changed to a different value.

29. The method, as claimed in claim 27, wherein:

said step of performing genetic operations includes the step of performing genetic operations based on probability.

30. The method, as claimed in claim 20, further including the step of:

storing selected fitness values determined in said first and second determining steps, along with corresponding parameter value strings, in a memory.

31. The method, as claimed in claim 30, wherein:

said step of choosing a parameter value string includes the step of accessing said memory.

32. A method for tuning a channel in a data storage device, wherein said channel transfers data between a storage medium and an exterior environment, said method comprising the steps of:

generating a first plurality of parameter value strings, each parameter value string including a value for each of a plurality of predetermined channel parameters;

separately applying each of said first plurality of parameter value strings to said channel to determine a plurality of performance characteristics for said channel;

determining fitness values for parameter value strings in said first plurality using said plurality of performance characteristics, each fitness value being indicative of the desirability of a corresponding parameter value string;

selecting mates from said first plurality of parameter value strings using said fitness values determined in said step of determining, wherein a probability that a parameter value string will be selected is approximately proportional to the magnitude of a corresponding fitness value;

performing a genetic operation on said selected mates to generate a second plurality of parameter value strings;

repeating said steps of applying, determining, selecting, and performing for said second plurality of parameter value strings; and choosing a parameter value string that produces a best fitness value.

* * * * *

UNITED STATES PATENT AND TRADEMARK OFFICE
CERTIFICATE OF CORRECTION

PATENT NO. : 5,781,699
DATED : July 14, 1998
INVENTOR(S) : Dittmar et al.

It is certified that error appears in the above-identified patent and that said Letters Patent is hereby corrected as shown below:

On the cover page, INID Code No. 75, Martin Lynch of Boulder, Colo. should be added as an inventor.

At column 4, line 14, "FIG. 7 is" should be deleted and --FIGS. 7A, 7B, 7C and 7D are portions of-- inserted therefor. In column 12, line 5 of Claim 1, "using a generic process" should be deleted. In column 12, line 8 of Claim 1, --using a genetic process-- should be inserted after "channel." In column 14, line 10 of Claim 16, "calculating" should be deleted and --determining-- inserted therefor.

In column 13, line 2 of Claim 16, "generic" should be deleted and --genetic-- inserted therefor.

Signed and Sealed this

Sixth Day of October, 1998

*Attest:*

BRUCE LEHMAN

*Attesting Officer*     Commissioner of Patents and Trademarks